United States Patent
Manda et al.

(10) Patent No.: US 11,265,908 B2
(45) Date of Patent: Mar. 1, 2022

(54) METHOD AND APPARATUS FOR HANDLING OF UPLINK TRANSMISSION SKIPPING

(71) Applicant: QUALCOMM Incorporated, San Diego, CA (US)

(72) Inventors: Avinash Manda, San Diego, CA (US); Bao Vinh Nguyen, San Diego, CA (US); Shailesh Maheshwari, San Diego, CA (US); Krishna Chaitanya Mukkera, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 63 days.

(21) Appl. No.: 16/591,228

(22) Filed: Oct. 2, 2019

(65) Prior Publication Data
US 2021/0105811 A1    Apr. 8, 2021

(51) Int. Cl.
| | |
|---|---|
| *H04W 72/14* | (2009.01) |
| *H04L 5/00* | (2006.01) |
| *H04L 1/00* | (2006.01) |
| *H04W 52/02* | (2009.01) |
| *H04W 80/02* | (2009.01) |

(52) U.S. Cl.
CPC ........... *H04W 72/14* (2013.01); *H04L 1/0008* (2013.01); *H04L 5/001* (2013.01); *H04W 52/0222* (2013.01); *H04W 80/02* (2013.01)

(58) Field of Classification Search
CPC . H04W 72/14; H04W 52/0222; H04W 80/02; H04L 1/0008; H04L 5/001
See application file for complete search history.

(56) References Cited

U.S. PATENT DOCUMENTS

2010/0150082 A1* 6/2010 Shin .................. H04W 72/1284
370/329

FOREIGN PATENT DOCUMENTS

| EP | 2244515 A1 | 10/2010 |
|---|---|---|
| EP | 2398181 A2 | 12/2011 |
| EP | 3226639 A1 | 10/2017 |

OTHER PUBLICATIONS

International Search Report and Written Opinion—PCT/US2020/053409—ISA/EPO—dated Jan. 21, 2021.

* cited by examiner

*Primary Examiner* — Kevin C. Harper
*Assistant Examiner* — Henry Baron
(74) *Attorney, Agent, or Firm* — Seyfarth Shaw, LLP (57) ABSTRACT

Methods, systems, and devices for wireless communication are described. The method may include receiving an UL grant for each CC of a plurality of CCs. In an aspect, each UL grant may include a number of transport blocks (TBs) assigned to each CC. The method may further include sorting CCs among the plurality of CCs as a function at least in part based on the number of TB for each of the CCs, and transmitting one or more packet data units (PDUs) using a subset of CCs of the plurality of CCs. In an aspect, the subset of CCs may be based at least in part on the sorting, and any CC of the plurality of CCs in which only medium access control (MAC) padding PDUs would be transmitted may not be included in the subset of CCs.

28 Claims, 7 Drawing Sheets

METHOD AND APPARATUS FOR HANDLING OF UPLINK TRANSMISSION SKIPPING

BACKGROUND

Field

The present disclosure relates generally to communication systems, and more particularly, to handling of uplink (UL) transmission (TX) skipping of one or more component carriers (CCs).

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple radio access technologies (RATs) have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The described techniques relate to improved methods, systems, devices, or apparatuses that support optimized uplink (UL) transmission (TX) skipping of one or more component carriers (CCs) in a carrier aggregation (CA) environment.

A method of wireless communication is described. The method may include receiving an UL grant for each CC of a plurality of CCs. In an aspect, each UL grant may include a number of transport blocks (TBs) assigned to each CC. The method may further include sorting CCs among the plurality of CCs as a function at least in part based on the number of TB for each of the CCs, and transmitting one or more packet data units (PDUs) using a subset of CCs of the plurality of CCs. In an aspect, the subset of CCs may be based at least in part on the sorting, and any CC of the plurality of CCs in which only medium access control (MAC) padding PDUs would be transmitted may not be included in the subset of CCs.

An apparatus for wireless communication is described. The apparatus may include means for receiving an UL grant for each CC of a plurality of CCs. In an aspect, each UL grant may include a number of transport blocks (TBs) assigned to each CC. The apparatus may further include means for sorting CCs among the plurality of CCs as a function at least in part based on the number of TB for each of the CCs, and means for transmitting one or more packet data units (PDUs) using a subset of CCs of the plurality of CCs. In an aspect, the subset of CCs may be based at least in part on the sorting, and any CC of the plurality of CCs in which only medium access control (MAC) padding PDUs would be transmitted may not be included in the subset of CCs.

Another apparatus for wireless communication is described. The apparatus may include a processor, memory in electronic communication with the processor, and instructions stored in the memory. The instructions may be executable by the processor to cause the apparatus to receive an UL grant for each CC of a plurality of CCs. In an aspect, each UL grant may include a number of transport blocks (TBs) assigned to each CC. The instructions may be executable by the processor to further cause the apparatus to sort CCs among the plurality of CCs as a function at least in part based on the number of TB for each of the CCs, and transmit one or more packet data units (PDUs) using a subset of CCs of the plurality of CCs. In an aspect, the subset of CCs may be based at least in part on the sorting, and any CC of the plurality of CCs in which only medium access control (MAC) padding PDUs would be transmitted may not be included in the subset of CCs.

A non-transitory computer readable medium storing code for wireless communication is described. The code may include instructions executable by a processor to receive an UL grant for each CC of a plurality of CCs. In an aspect, each UL grant may include a number of transport blocks (TBs) assigned to each CC. The code may further include instructions executable by a processor to sort CCs among the plurality of CCs as a function at least in part based on the number of TB for each of the CCs, and transmit one or more packet data units (PDUs) using a subset of CCs of the plurality of CCs. In an aspect, the subset of CCs may be based at least in part on the sorting, and any CC of the plurality of CCs in which only medium access control (MAC) padding PDUs would be transmitted may not be included in the subset of CCs.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Figure 1:
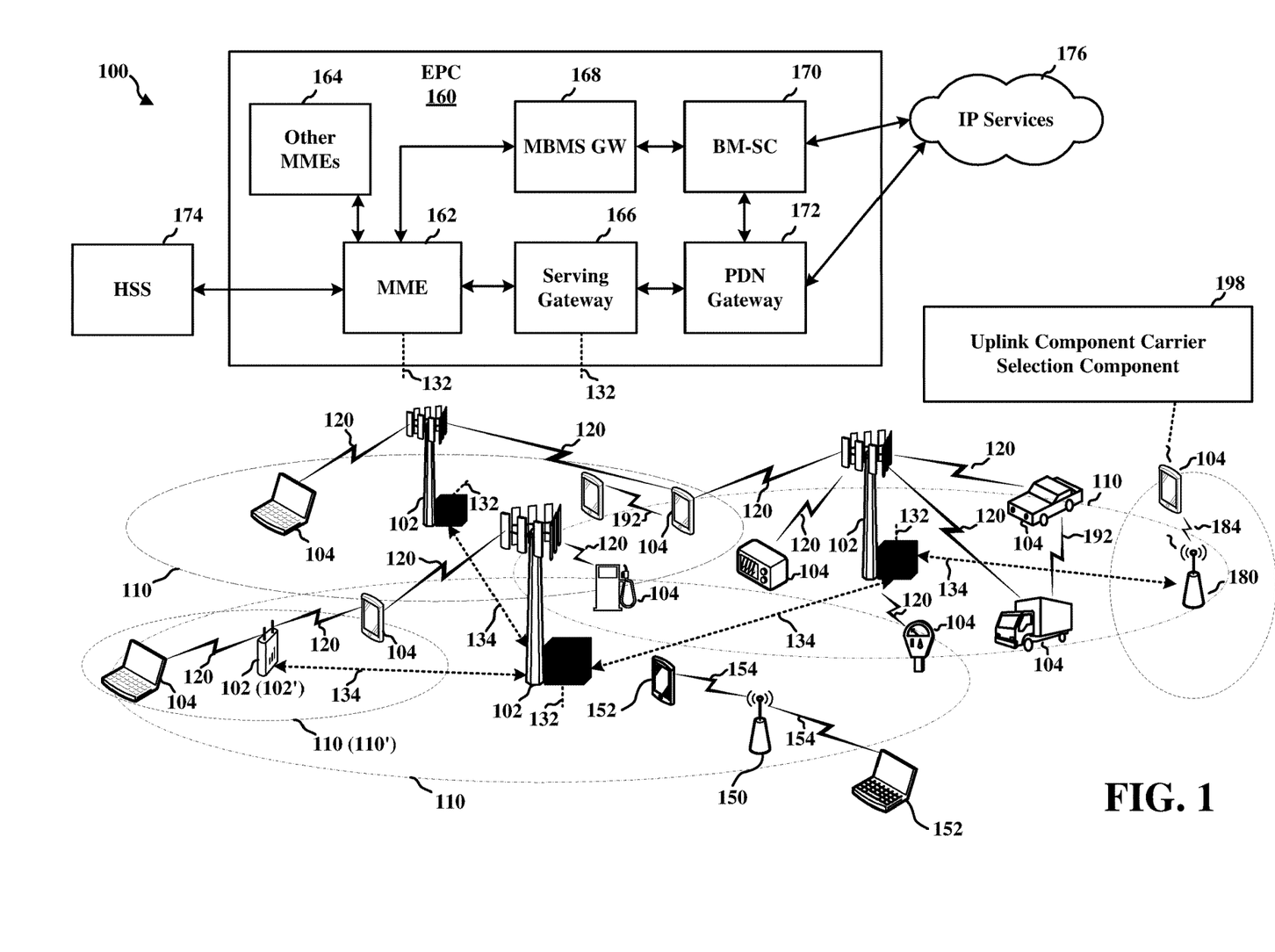
FIG. 1 is a diagram illustrating an example of a wireless communications system and an access network.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs 104 may be referred to as IoT devices (e.g., parking meter, gas pump, toaster, vehicles, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a UL CC selection component 198. Initially, although the following description may be focused towards discussion of transmission on selected UL CCs in a 5G NR environment, the concepts described herein may be applicable to any situation in which a UE is communicating through a RAT that supports selective skipping of UL transmissions. In an aspect, UL CC selection component 198 may enable UE 104 to select a subset of assigned CCs upon which to perform UL transmissions. Generally, UE 104 may receive, at a physical (PHY) layer, UL grants on each of multiple CCs through downlink control information (DCI) grants. The UL grants may be communicated from the PHY layer to a higher layer (e.g., L2 layer). The L2 layer may include a packet data convergence protocol (PDCP) layer, a radio link control (RLC) layer, and a medium access control (MAC) layer. At the L2 layer, UE 104 may build packets (e.g., packet data units (PDUs)) based on data stored in a UE104 buffer and may add padding MAC PDUs based on the UL grants. By way of example, and not limitation, there is a relaxation of UL transmission requirements in 5G NR that allow the UE 104 to selectively skip UL transmissions. In an aspect, this relaxation may be enabled and/or disabled through a flag (e.g., an UL transmission skipping (ULTXSKIP) flag).

As described in more detail below, UL CC selection component 198 may enable UE 104 to sort UL grants and selectively transmission on MAC PDUs on a subset of CCs while skipping transmission of CCs that would substantially be carrying MAC padding data. In an aspect, UL CC selection component 198 may enable the PHY Layer to sort physical uplink shared channel (PUSCH) CCs in descending order of UL DCI grant TB size and inform the L2 layer to build packets in the sorted order on the CCs. In such an aspect, based at least in part on pending UL Data to transmit (e.g., buffered data), the L2 layer may build packets in the sorted order received from PHY Layer. Further, in such an aspect, after packets have been built from data in an UL available buffer, if UE 104 data buffer is empty, and there is additional PUSCH grant TBs available, MAC/L2 may fill the remaining PUSCH CC space with MAC Padding PDUs. Thereafter, in such an aspect, UL CC selection component 198 may enable UE 104 to skip transmission of PUSCH on CCs that substantially carry MAC padding data. In another aspect, the selective skipping functionality of UL CC selection component 198 may be dynamically turned on or off based on various factors, such as but not limited to, timeline restrictions, CA configurations, etc. Additionally, or in the alternative, in another aspect, UL CC selection component 198 may enable the PHY Layer to implement PUSCH CC selection priority order. In such an aspect, the selection may be a function of values such as but not limited to a number of UL DCI grants received, a number of activated CCs, grant TB sizes, each MAC PDU size, UL Data buffer size, CC Transmission powers, etc. In such an aspect, at least one of the values may be provided to the PHY layer from the MAC layer. Further, in such an aspect, UL CC selection component 198 may enable the PHY Layer to determine a PUSCH CC order that results in a substantially minimum presence of MAC padding data.

By enabling UE 104 to selectively skip transmission on CCs that are substantially carrying MAC padding data, UL CC selection component 198 provides many benefits to UE 104. Benefits, such as but not limited to, UE power saving, lesser UE processing resources, lesser UE transmission resources, less system interference, higher battery saving in high throughput scenarios, such as where there is substantially continuous UL activity, etc.

Figure 2A:
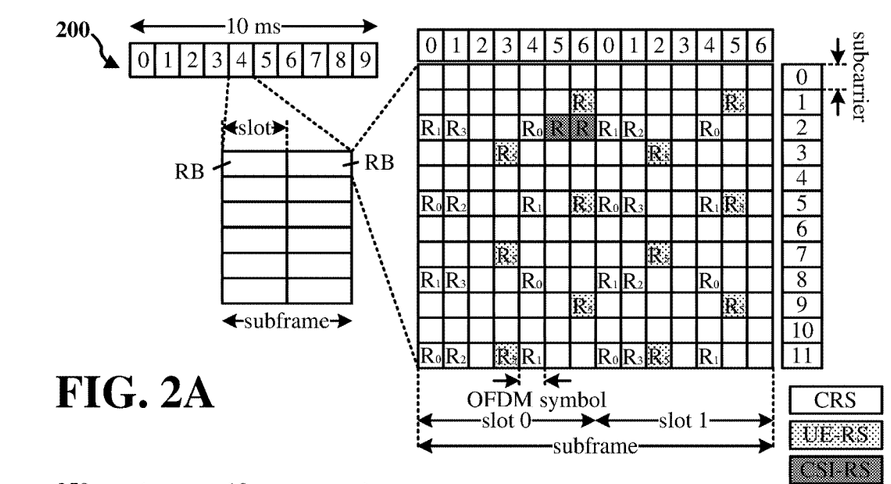
FIGS. 2A, 2B, 2C, and 2D are diagrams illustrating examples of a DL frame structure, downlink (DL) channels within the DL frame structure, an uplink (UL) frame structure, and UL channels within the UL frame structure, respectively.
Figure 2B:
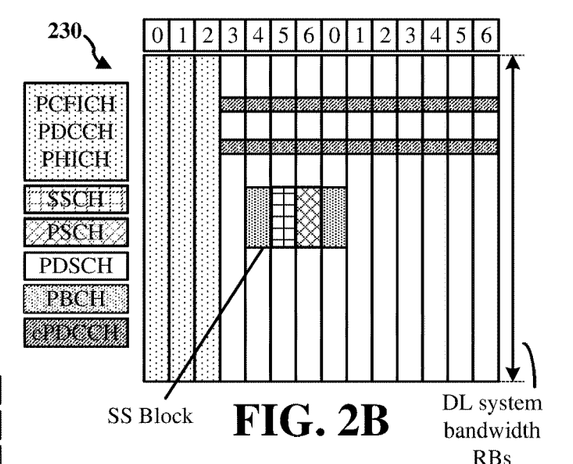
Figure 2C:
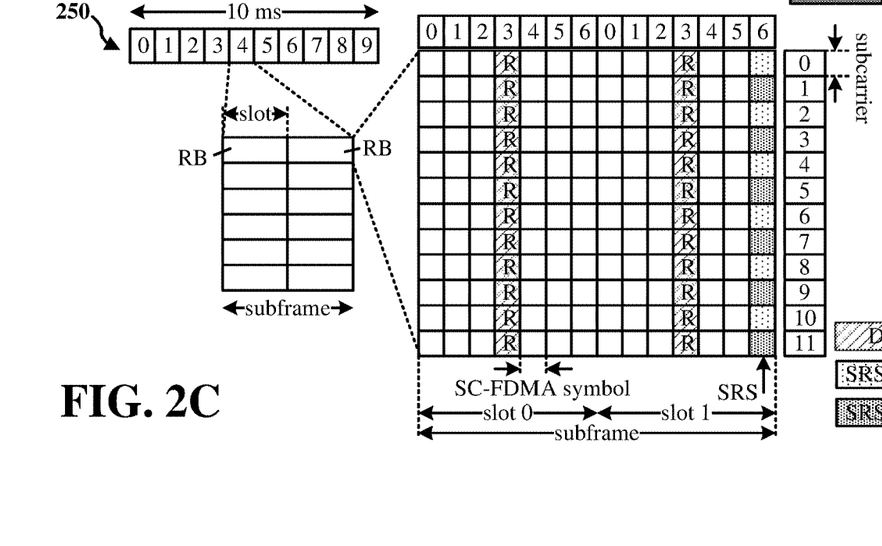
Figure 2D:
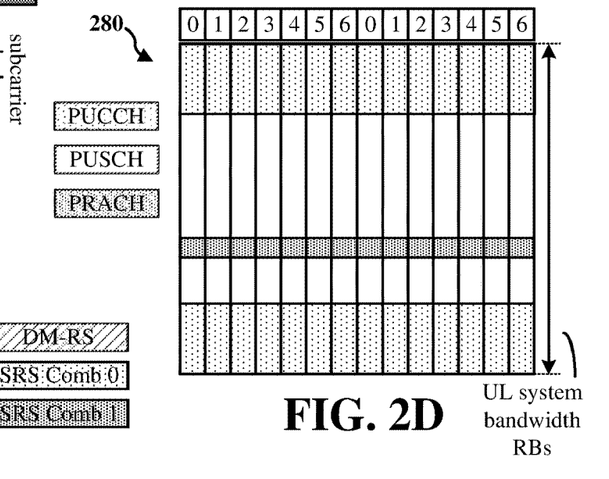

FIG. 2A is a diagram 200 illustrating an example of a DL frame structure. FIG. 2B is a diagram 230 illustrating an example of channels within the DL frame structure. FIG. 2C is a diagram 250 illustrating an example of an UL frame structure. FIG. 2D is a diagram 280 illustrating an example of channels within the UL frame structure. Other wireless communication technologies may have a different frame structure and/or different channels. A frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). For a normal cyclic prefix, an RB may contain 12 consecutive subcarriers in the frequency domain and 7 consecutive symbols (for DL, OFDM symbols; for UL, SC-FDMA symbols) in the time domain, for a total of 84 REs. For an extended cyclic prefix, an RB may contain 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R).

FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE 104 to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB), may be logically grouped with the PSCH and SSCH to form a synchronization signal (SS) block. The MIB provides a number of RBs in the DL system bandwidth, a PHICH configuration, and a system frame number (SFN). The physical downlink shared channel (PDSCH) carries user data, broadcast system information not transmitted through the PBCH such as SIBs, and paging messages.

As illustrated in FIG. 2C, some of the REs carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data and may additionally be used to carry a buffer status report (BSR), a power headroom report (PHR), and/or UCI.

Figure 3:
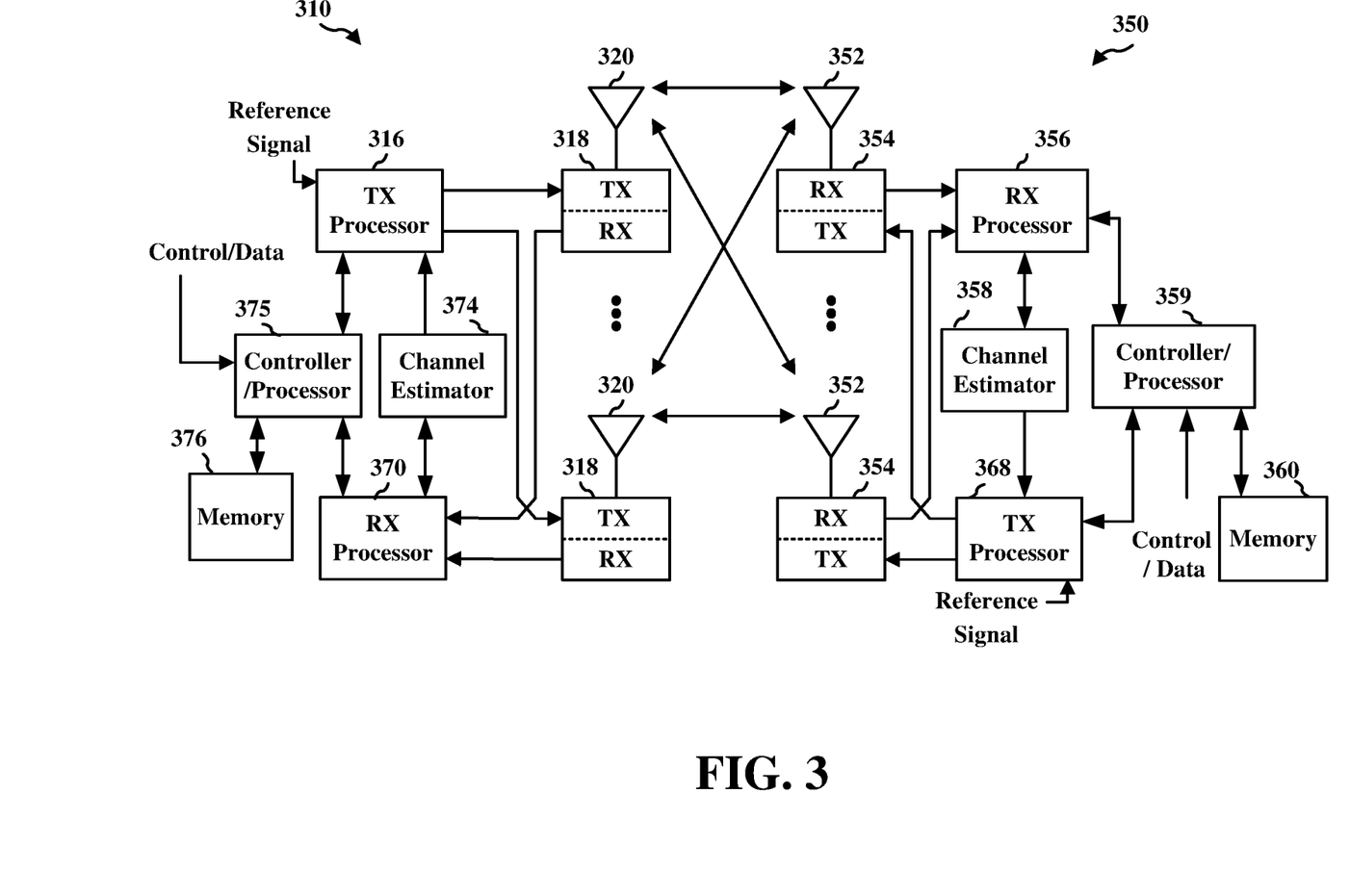
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a RRC layer, and layer 2 includes a PDCP layer, a RLC layer, and a MAC layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
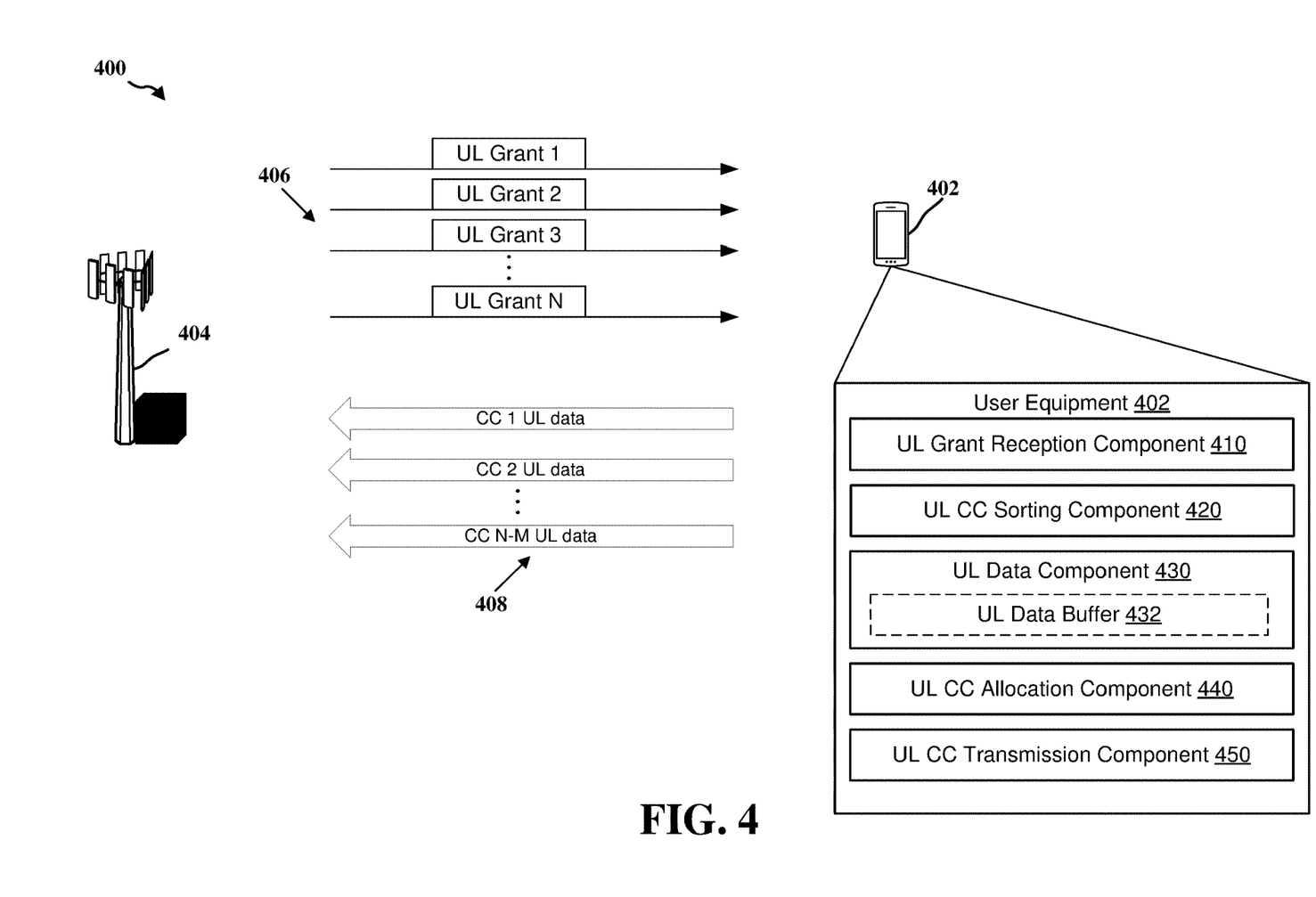
FIG. 4 is a diagram illustrating an example wireless communications system with a UE and a base station (BS) able to support carrier aggregation (CA).

FIG. 4 is a diagram illustrating an example wireless communications system 400 with a UE 402 that may communicate with at least one base station 404 using one or more RATs (e.g., 5G NR, LTE, 3G, 2G, EV-DO, etc.). In an aspect, UE 402 may communicate with base station 404 over multiple CCs. In such an aspect, base station 404 may transmit DCI grants 406 for each CC including UL grants (e.g., UL grant 1, UL grant 2, UL grant 3, UL grant N). UE 402 may communicate UL data 408 (e.g., CC 1 UL data, CC 2 UL data, CC N UL data, etc.). In an aspect to be described in more detail below, UE 402 may skip transmissions on UL CCs where substantially only MAC padding data was to be transmitted. In such an aspect, assuming "N" UL grants are assigned, then UE 402 may transmit UL data on N minus M UL CCs, where M is the number of CCs that would substantially only be transmitting MAC padding data.

UE 402 may include UL grant reception component 410 that enables UE 402 to receive UL grants 406, where each UL grant 406 may be associated with a different CC. Further, each UL grant 406 may indicate a number of transports blocks (TBs) available for UL communications. UE 402 may further include UL CC sorting component 420 that enables UE 402 to sort the UL grants 406. By way of example, and not limitation, UL CC sorting component 420 may sort the UL grants 406 based on a number of UL DCI grants received, a number of activated CCs, grant TB sizes, each MAC PDU size, UL Data buffer size, CC Transmission powers, etc. In an aspect, UL CC sorting component 420 may sort the UL grants 406 at the PHY layer. UE 402 may further include UL data component 430 that enables UE 402 to determine if any data is being queued for uplink transmission (e.g., in UL data buffer 432), and if there is data, much data awaiting uplink transmission. In an aspect, the UL data component 430 may communicate information to UL CC sorting component 420 at the PHY layer to aid in the sorting process. The information may include, but is not limited to, UL data buffer 432 size, CC transmission powers, etc. UE 402 may further include UL CC allocation component 440 that enables UE 402 to allow UL data (e.g., from UL data buffer 432) selectively to the sorted UL CCs. For example, UL CC allocation component 440 may allocate UL data to UL CCs in such a manner as to reduce a number of CCs that are used for communicating UL data. In another example, UL CC allocation component 440 may allocate UL data to UL CCs in such a manner as to reduce the total transmission power used by UE 402 to transmit the UL data. In still another example, UL CC allocation component 440 may allocate UL data to UL CCs as a function of values such as, but not limited to, a number of UL DCI grants received, a number of activated CCs, grant TB sizes, each MAC PDU size, UL Data buffer size, CC Transmission powers, etc. In an aspect, UL CC allocation component 440 may be associated with MAC layer functionality. In another aspect, UL CC allocation component 440 may be associated with PHY layer functionality. UE 402 may further include UL CC transmission component 450 that enables UE 402 to transmit UL data on multiple UL CCs 408. In an aspect, based at least in part on the allocation of UL data to CCs by UL CC allocation component 440, UL CC transmission component 450 may transmit UL data of fewer CCs than there were UL grants 406 assigned. In such an aspect, use of fewer than an assigned number of UL CCs may be enabled by a flag (e.g., ULTXSKIP).

In an operational aspect, UE 402 may have 1000 bytes in UL data buffer 432. Further, UE 402, through UL grant reception component 410, may receive UL DCI grants on multiple CCs, each with a defined number of TBs available (e.g., CA0 with 200 bytes, CA1 with 100 bytes, CA2 with 300 bytes, CA3 with 100 bytes, CA4 with 500 bytes). In such an operational aspect, UL CC sorting component 420 may sort the CAs based on a factor, such as but not limited to, grant TB size. Continuing with the example CA values, the sorted order would be CA4, CA2, CA0, CA1, then CA3. Further in the operational aspect, UL data component 430, with 1000 bytes in UL data buffer 432, provide data to UL CC allocation component 440 to build packets on CA4, CA2, and CA0. Further, UL CC allocation component 440 would not build packets for CA1 and CA3 as these would just be MAC padding data. In an aspect, the allocation may be performed at the MAC layer. In such an aspect, UL CC allocation component 440 may inform the PHY layer which CCs have UL data and which would substantially have MAC padding data. In another aspect, the allocation may be performed at the PHY layer. Still further, in the operational aspect, UL CC transmission Component 450 transmits the UL data on CA4, CA2, CA0 while skipping transmission on CA1 and CA3.

Figure 5:
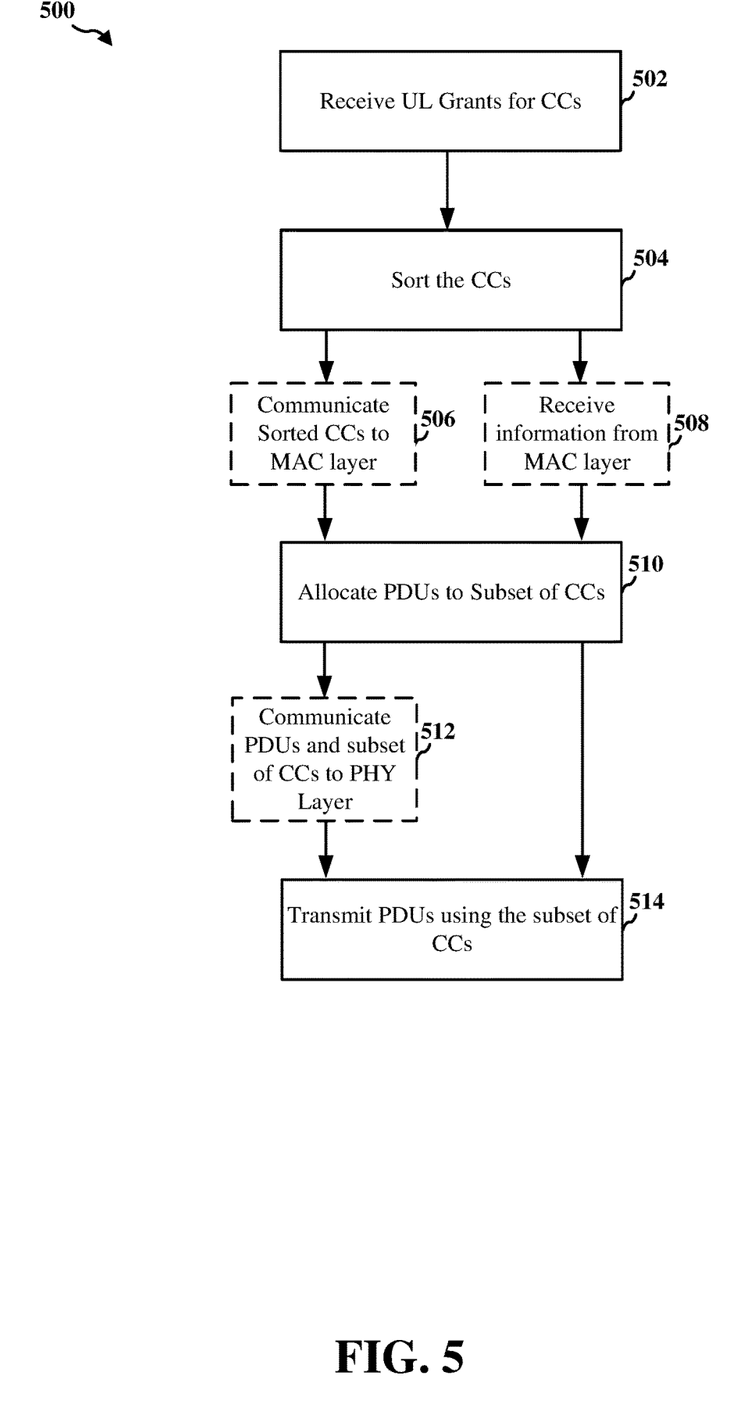
FIG. 5 is a flowchart of a method of wireless communication.

FIG. 5 is a flowchart 500 of a method of wireless communication. The method may be performed by a UE (e.g., UE 104, UE 402). At 502, the UE may receive UL grants from multiple CCs. In an aspect, each UL grant may indicate a number of TBs available for UL transmissions. Further, in an aspect, the reception of the UL grants may be associated with the PHY layer. In an aspect, UE 402 UL grant reception component 410 may be configured to receive the UL grants such as described at 502.

At 504, the UE may sort component carriers (CCs) among the plurality of CCs. In an aspect, the sorting may be done as a function at least in part based on the number of TB for each of the CCs. In an aspect, the sorting of the CCs may be based on prioritizing a CC with a larger TB size over a CC with a smaller TB size. In an aspect, the sorting of the CCs may be based on minimizing UE power usage. In an aspect, UE 402 UL CC sorting component 420 may be configured sort the CCs as described at 504.

In an optional aspect, at 506, the UE may communicate information associated with the sorting of the CCs to a MAC layer. In an aspect, UE 402 UL CC sorting component 420 may be configured communicate the CCs to the MAC layer as described at 506.

In a further optional aspect, at 508, information may be received at the PHY layer from the MAC layer. For example, the MAC layer may provide information, such as but not limited to, a number of UL DCI grants received, a number of activated CCs, grant TB sizes, each MAC PDU size, UL Data buffer size, CC Transmission powers, etc. In an aspect, UE 402 UL CC sorting component 420 may be configured communicate the information from the MAC layer to the PHY layer as described at 508.

At 510, the UE allocates data to a subset of the sorted CCs. In an aspect associated with 506, the allocation may be performed at the MAC layer. While in an aspect associated with 508, the allocation may be performed at the PHY layer. In an aspect, the subset of CCs may be defined as CCs that may be used to communicate data other than MAC padding data. In other words, a CC that may substantially be used to communicate MAC padding data is not included in the subset of CCs. In an aspect, UE 402 UL CC allocation component 440 may be configured allocate data to a subset of CCs as described at 510.

In an optional aspect, at 512, the PDUs and information associated with the subset of CCs may be communicated from the MAC layer to the PHY layer. In the optional aspect associated with 506, the MAC layer performs allocation of the subset of CCs and then communicates this information back to the MAC layer. In an aspect, UE 402 UL CC allocation component 440 may be configured communicate data and information related to the subset of CCs as described at 512.

At 514, the UE transmits PDUs using the subset of CCs. In an aspect, the UE may skip transmission on CCs that substantially include MAC padding data. In an aspect, transmission of the subset of CCs may be allowed when a flag is enabled (e.g., ULTXSKIP). Further, the flag may be dynamically changed.

Figure 6:
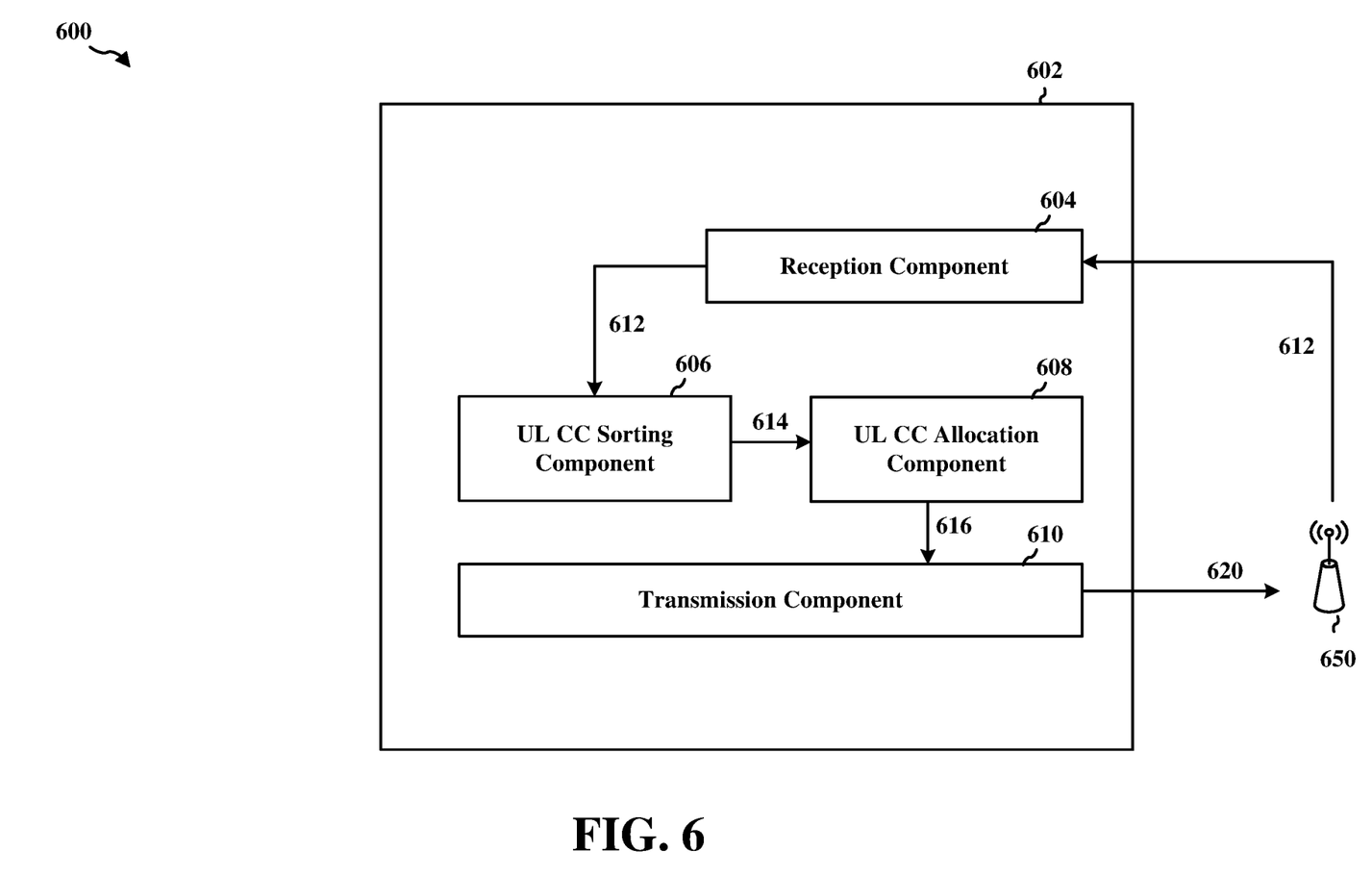
FIG. 6 is a conceptual data flow diagram illustrating the data flow between different means/components in an example apparatus.

FIG. 6 is a conceptual data flow diagram 600 illustrating the data flow between different means/components in an exemplary apparatus 602. The apparatus may be a UE. The apparatus includes a reception component 604 that may receive an UL grant 612 for each CC of a plurality of CCs. In an aspect, each UL grant may include a number of transport blocks (TBs) assigned to each CC. The apparatus may further include an UL CC sorting component 606 that may use the UL grant information 612 to provide UL CC allocation component 608 with a sorted list of CCs 614. The UL CC allocation component 608 may determine a subset of CCs upon which UL data is to be transmitted and provide the subset of CCs 616 to transmission component 610. Transmission component 606 may transmit UL data 620 using the subset of CCs 616.

The apparatus may include additional components that perform each of the blocks of the algorithm in the aforementioned flowchart of FIG. 5. As such, each block in the aforementioned flowchart of FIG. 5 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 7:
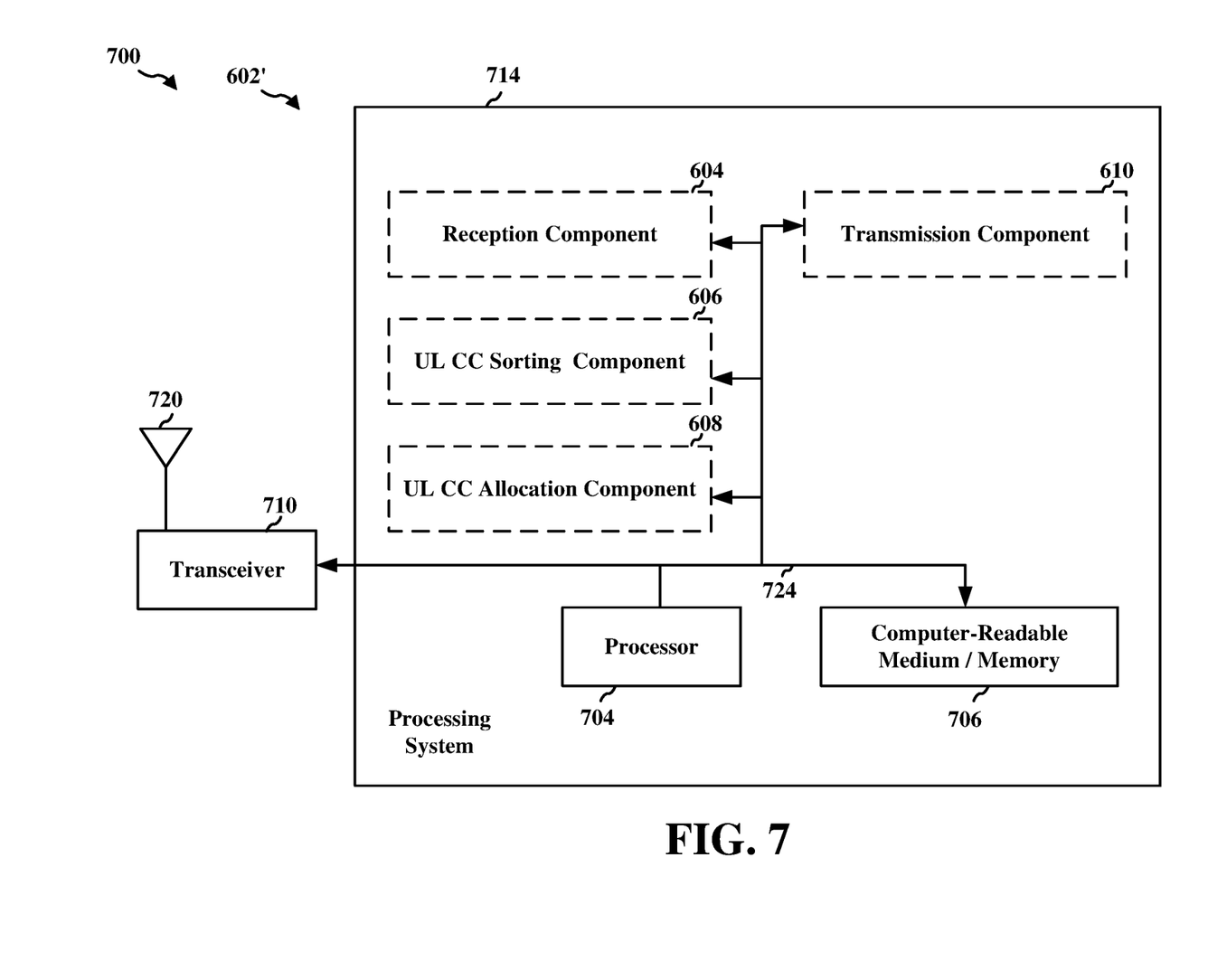
FIG. 7 is a diagram illustrating an example of a hardware implementation for an apparatus employing a processing system.

FIG. 7 is a diagram 700 illustrating an example of a hardware implementation for an apparatus 602' employing a processing system 714. The processing system 714 may be implemented with a bus architecture, represented generally by the bus 724. The bus 724 may include any number of interconnecting buses and bridges depending on the specific application of the processing system 714 and the overall design constraints. The bus 724 links together various circuits including one or more processors and/or hardware components, represented by the processor 704, the components 604, 606, 608, 610 and the computer-readable medium/memory 706. The bus 724 may also link various other circuits such as timing sources, peripherals, voltage regulators, and power management circuits, which are well known in the art, and therefore, will not be described any further.

The processing system 714 may be coupled to a transceiver 710. The transceiver 710 is coupled to one or more antennas 720. The transceiver 710 provides a means for communicating with various other apparatus over a transmission medium. The transceiver 710 receives a signal from the one or more antennas 720, extracts information from the received signal, and provides the extracted information to the processing system 714, specifically the reception component 604. In addition, the transceiver 710 receives information from the processing system 714, specifically the transmission component 610, and based on the received information, generates a signal to be applied to the one or more antennas 720. The processing system 714 includes a processor 704 coupled to a computer-readable medium/memory 706. The processor 704 is responsible for general processing, including the execution of software stored on the computer-readable medium/memory 706. The software, when executed by the processor 704, causes the processing system 714 to perform the various functions described supra for any particular apparatus. The computer-readable medium/memory 706 may also be used for storing data that is manipulated by the processor 704 when executing software. The processing system 714 further includes at least one of the components 604, 606, 608, 610. The components may be software components running in the processor 704, resident/stored in the computer readable medium/memory 706, one or more hardware components coupled to the processor 704, or some combination thereof. The processing system 714 may be a component of the UE 350 and may include the memory 360 and/or at least one of the TX processor 368, the RX processor 356, and the controller/processor 359.

In one configuration, the apparatus 602/602' for wireless communication includes means for receiving an UL grant for each CC of a plurality of CCs. In an aspect, each UL grant may include a number of TBs assigned to each CC. The apparatus 602/602' for wireless communication further include means for sorting CCs among the plurality of CCs as a function at least in part based on the number of TB for each of the CCs, and means for transmitting one or more PDUs using a subset of CCs of the plurality of CCs. In an aspect, the subset of CCs may be based at least in part on the sorting, and any CC of the plurality of CCs in which only MAC padding PDUs would be transmitted is not included in the subset of CCs. The aforementioned means may be one or more of the aforementioned components of the apparatus 602 and/or the processing system 714 of the apparatus 602' configured to perform the functions recited by the aforementioned means. As described supra, the processing system 714 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communications, comprising:
   receiving an uplink (UL) grant for each component carrier (CC) of a plurality of CCs, wherein each UL grant includes a number of transport blocks (TBs) assigned to each CC;
   sorting component carriers (CCs) among the plurality of CCs as a function at least in part based on the number of TB for each of the CCs;
   transmitting one or more packet data units (PDUs) using a subset of CCs of the plurality of CCs, wherein the subset of CCs is based at least in part on the sorting, and wherein any CC of the plurality of CCs in which only medium access control (MAC) padding PDUs would be transmitted is not included in the subset of CCs.

2. The method of claim 1, wherein the sorting is done at a physical (PHY) layer, and wherein the method further comprises:
   communicating information associated with the sorting of the CCs to a MAC layer;
   allocating, at the MAC layer, one or more PDUs to the subset of CCs of the plurality of CCs based on the information associated with the sorting of the CCs; and
   communicating, to the PHY layer, the one or more PDUs for transmission on the subset of CCs.

3. The method of claim 2, wherein a total number of TBs to be used for transmission of the one or more PDUs is less than a total number of TBs assigned in the UL grants by first number of TBs.

4. The method of claim 3, wherein the first number of TBs is greater than the number of TBs assigned to at least one CC of a plurality of CCs.

5. The method of claim 1, wherein the sorting of the CCs among the plurality of CCs is based on prioritizing a CC with a larger TB size over a CC with a smaller TB size.

6. The method of claim 1, wherein the sorting of the CCs among the plurality of CCs is based on minimizing power usage.

7. The method of claim 1, wherein transmission using the subset of CCs is allowed when an UL transmission skip (ULTXSKIP) flag is enabled.

8. The method of claim 7, wherein the ULTXSKIP flag is configured to be dynamically enabled or disabled.

9. The method of claim 1, further comprising:
   receiving, from a MAC layer, at least one of an UL data buffer size, a MAC PDU size, or any combination thereof; and
   wherein the sorting is further a function based at least in part on at least one of the UL data buffer size, the MAC PDU size, or any combination thereof.

10. The method of claim 9, wherein the sorting is further a function based at least in part on at least one of an activated number of CCs, a transmit power for each of CC, or any combination thereof.

11. An apparatus for wireless communications, comprising:
    means for receiving an uplink (UL) grant for each component carrier (CC) of a plurality of CCs, wherein each UL grant includes a number of transport blocks (TBs) assigned to each CC;
    means for sorting component carriers (CCs) among the plurality of CCs as a function at least in part based on the number of TB for each of the CCs;
    means for transmitting one or more packet data units (PDUs) using a subset of CCs of the plurality of CCs, wherein the subset of CCs is based at least in part on the sorting, and wherein any CC of the plurality of CCs in which only medium access control (MAC) padding PDUs would be transmitted is not included in the subset of CCs.

12. The method of claim 11, wherein the means for sorting further configured to:
    communicate information associated with the sorting of the CCs to a MAC layer;
    allocate, at the MAC layer, one or more PDUs to the subset of CCs of the plurality of CCs based on the information associated with the sorting of the CCs; and
    communicate, to the PHY layer, the one or more PDUs for transmission on the subset of CCs.

13. The apparatus of claim 12, wherein a total number of TBs to be used for transmission of the one or more PDUs is less than a total number of TBs assigned in the UL grants by first number of TBs, and wherein the first number of TBs is greater than the number of TBs assigned to at least one CC of a plurality of CCs.

14. The apparatus of claim 11, wherein the sorting of the CCs among the plurality of CCs is based on prioritizing a CC with a larger TB size over a CC with a smaller TB size, minimizing power usage, or any combination thereof.

15. The apparatus of claim 11, wherein transmission using the subset of CCs is allowed when an UL transmission skip (ULTXSKIP) flag is enabled, and wherein the ULTXSKIP flag is configured to be dynamically enabled or disabled.

16. The apparatus of claim 11, wherein the means for sorting is configured to:
    receive, from a MAC layer, at least one of an UL data buffer size, a MAC PDU size, or any combination thereof; and
    wherein the means for sorting is further a function based at least in part on at least one of the UL data buffer size, the MAC PDU size, or any combination thereof.

17. The apparatus of claim 16, wherein the means for sorting is further a function based at least in part on at least one of an activated number of CCs, a transmit power for each of CC, or any combination thereof.

18. A wireless communication device comprising:
    at least one modem;
    at least one processor communicatively coupled with the at least one modem; and
    at least one memory communicatively coupled with the at least one processor and storing processor-readable code that, when executed by the at least one processor in conjunction with the at least one modem, causes the wireless communication device to:
    receive an uplink (UL) grant for each component carrier (CC) of a plurality of CCs, wherein each UL grant includes a number of transport blocks (TBs) assigned to each CC;
    sort component carriers (CCs) among the plurality of CCs as a function at least in part based on the number of TB for each of the CCs;
    transmit one or more packet data units (PDUs) using a subset of CCs of the plurality of CCs, wherein the subset of CCs is based at least in part on the sorting, and wherein any CC of the plurality of CCs in which only medium access control (MAC) padding PDUs would be transmitted is not included in the subset of CCs.

19. The apparatus of claim 18, wherein the physical (PHY) layer sorts the CCs, and wherein the wireless communication device is further configured to:
communicate information associated with the sorting of the CCs to a MAC layer;
allocate, at the MAC layer, one or more PDUs to the subset of CCs of the plurality of CCs based on the information associated with the sorting of the CCs; and
communicate, to the PHY layer, the one or more PDUs for transmission on the subset of CCs.

20. The apparatus of claim 19, wherein a total number of TBs to be used for transmission of the one or more PDUs is less than a total number of TBs assigned in the UL grants by first number of TBs.

21. The apparatus of claim 20, wherein the first number of TB s is greater than the number of TBs assigned to at least one CC of a plurality of CCs.

22. The apparatus of claim 18, wherein the CCs among the plurality of CCs are sorted is based on prioritizing a CC with a larger TB size over a CC with a smaller TB size.

23. The apparatus of claim 18, wherein the CCs among the plurality of CCs are sorted based on minimizing power usage.

24. The apparatus of claim 18, wherein transmission using the subset of CCs is allowed when an UL transmission skip (ULTXSKIP) flag is enabled.

25. The apparatus of claim 24, wherein the ULTXSKIP flag is configured to be dynamically enabled or disabled.

26. The apparatus of claim 18, wherein the wireless communication device is further configured to:
receive, from a MAC layer, at least one of an UL data buffer size, a MAC PDU size, or any combination thereof; and
wherein the CCs among the plurality of CCs are further sorted a function based at least in part on at least one of the UL data buffer size, the MAC PDU size, or any combination thereof.

27. The apparatus of claim 26, wherein the CCs among the plurality of CCs are further sorted a function based at least in part on at least one of an activated number of CCs, a transmit power for each of CC, or any combination thereof.

28. A non-transitory computer-readable medium, comprising code executable by one or more processors configured to:
receive an uplink (UL) grant for each component carrier (CC) of a plurality of CCs, wherein each UL grant includes a number of transport blocks (TBs) assigned to each CC;
sort component carriers (CCs) among the plurality of CCs as a function at least in part based on the number of TB for each of the CCs;
transmit one or more packet data units (PDUs) using a subset of CCs of the plurality of CCs, wherein the subset of CCs is based at least in part on the sorting, and wherein any CC of the plurality of CCs in which only medium access control (MAC) padding PDUs would be transmitted is not included in the subset of CCs.

* * * * *